Nov. 1, 1938.        F. J. ARNOLD        2,134,849
BUS CLAMP
Filed July 6, 1937        5 Sheets-Sheet 1

Inventor:
Forest J. Arnold
By Brown, Jackson, Boettcher & Dienner
Attys.

Nov. 1, 1938.  F. J. ARNOLD  2,134,849
BUS CLAMP
Filed July 6, 1937  5 Sheets-Sheet 2
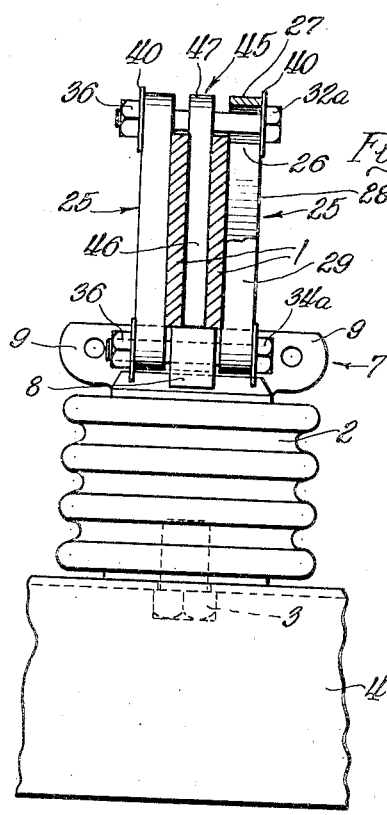
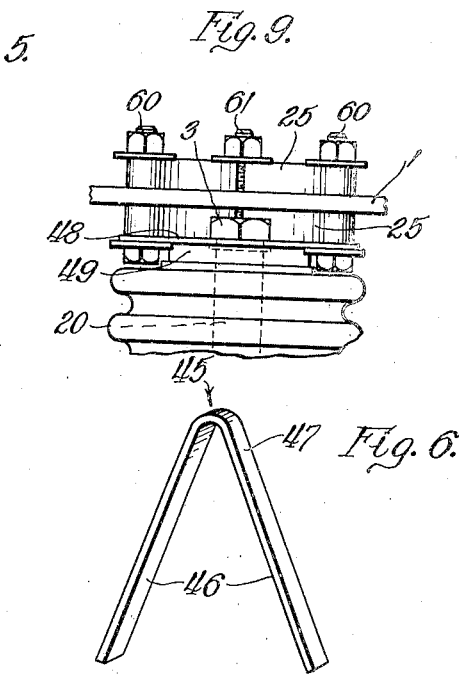
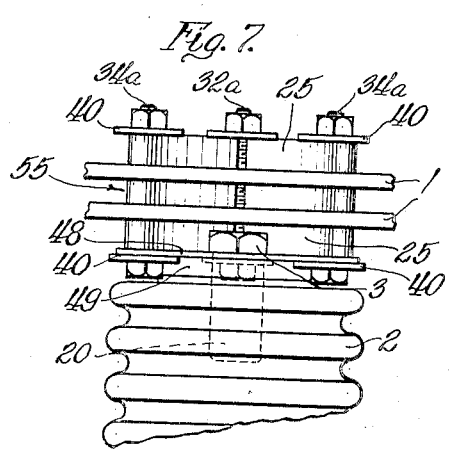
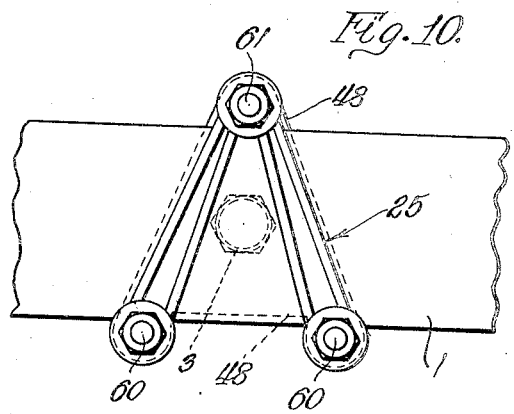
Inventor:
Forest J. Arnold
By Brown, Jackson, Boettcher & Dienner
Attys.

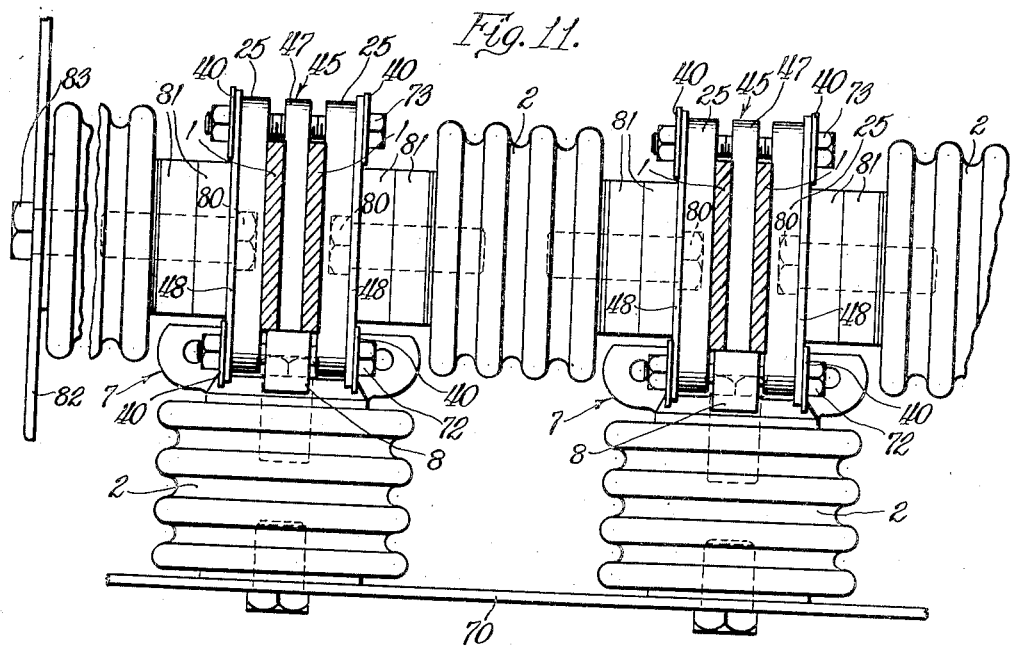
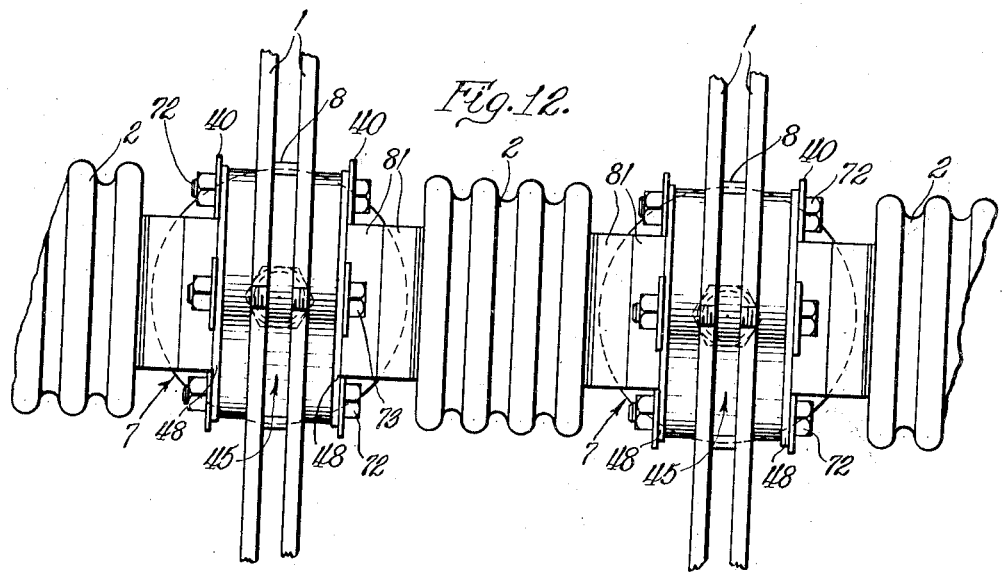

Nov. 1, 1938.   F. J. ARNOLD   2,134,849
BUS CLAMP
Filed July 6, 1937   5 Sheets-Sheet 4
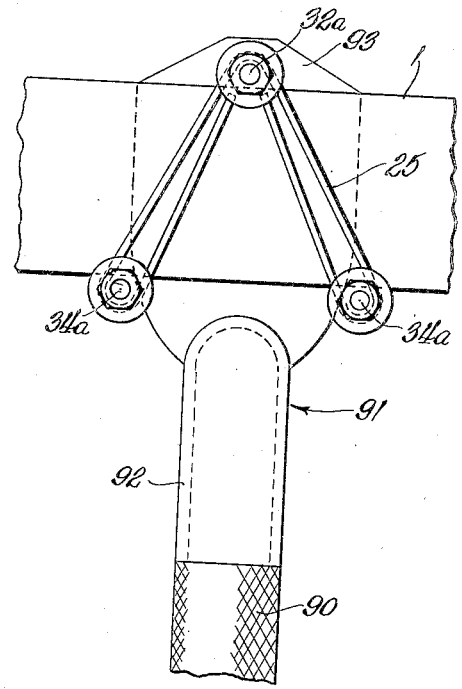
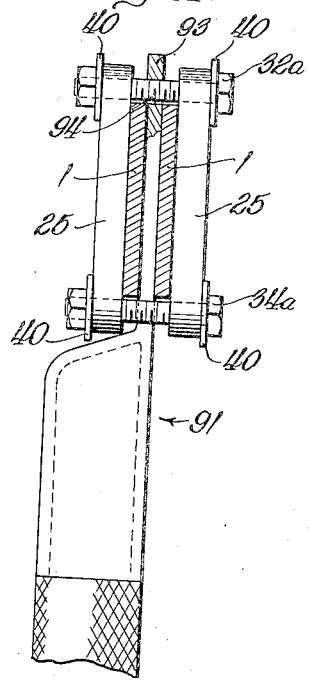
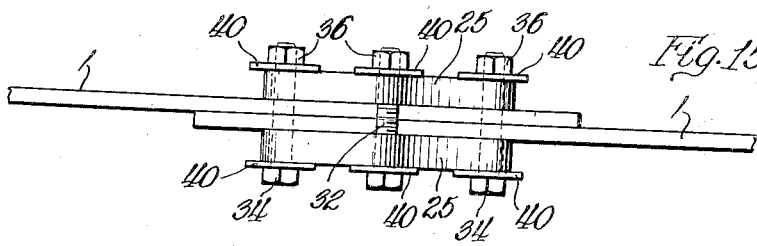
Inventor
Forest J. Arnold
By Brown, Jackson, Boettcher & Dienner
Att'ys.

Nov. 1, 1938.                 F. J. ARNOLD                2,134,849
                               BUS CLAMP
                          Filed July 6, 1937          5 Sheets-Sheet 5

Inventor:
Forest J. Arnold
By Brown, Jackson, Boettcher & Dienner
Attys.

Patented Nov. 1, 1938

2,134,849

UNITED STATES PATENT OFFICE 2,134,849

BUS CLAMP

Forest J. Arnold, Antioch, Ill.

Application July 6, 1937, Serial No. 152,106

10 Claims. (Cl. 173—251)

The present invention relates generally to bus construction and is principally concerned with the provision of a novel form of bus clamp or separator especially adapted for use in joining bus bars or as a bus support when used in conjuction with a suitable insulator.

Heretofore, bus clamps and the like have generally been constructed of malleable iron, bronze, or similar material which made the clamps relatively expensive. Attempts have also been made to construct bus clamps of sheet metal stampings or the like, generally in the form of flanged plates. Also, in using bus clamps for buses carrying alternating current it is desirable to prevent the establishment of a magnetic loop about the bus bar so as to keep down the amount of current induced in the bus clamps.

The principal object of the present invention is the provision of a bus clamp which is exceptionally strong, having, in fact, greater strength than conventional bus clamps of malleable iron, bronze, or stamped sheet metal, yet so constructed that there is little loss from induced current in the clamps. More specifically, it is an object of the present invention to provide a bus clamp that is formed of a relatively narrow strap of metal, formed so that the clamping forces are applied to the clamp in edgewise relation, whereby with only a small cross section of metal exceptional strength is secured, particularly against lateral distortion.

A further object of my invention is the provision of a bus separator arranged to be disposed edgewise against the associated bus bars.

Preferably the strap or bar is made of stainless steel or the like to provide a clamp member or spacer of low magnetic properties.

These and other objects and advantages of the present invention will be apparent to those skilled in the art after a consideration of the following detailed description of the preferred form of invention, taken in conjunction with the accompanying drawings illustrating various applications of the present invention.

In the drawings:

Figure 5 is an end view of a bus support for a bus of the laminated type in which a pair of bars are mounted in spaced apart parallel relation;

Figure 6 is a view of a bus separator constructed according to the principles of the present invention;

Figure 7 illustrates the use of bus clamps with the bus bars disposed horizontally;

Figure 9 is a view similar to Figure 7 but illustrates the use of the bus clamps with a single bus bar disposed horizontally;

Figure 10 is a top view of the bus support and clamps shown in Figure 9;

Figure 11 illustrates the installation of bus clamps of the present invention as supports for flat bus bars disposed vertically and having cross braces;

Figure 12 is a top view of the construction illustrated in Figure 11;

Figure 13 illustrates the use of bus clamps constructed according to the principles of this invention for securing a bus bar terminal to one or more flat bus bars;

Figure 14 is an end of the construction shown in Figure 13;

Figure 15 illustrates the use of bus clamps of the present invention to connect two flat bus bars.

Figure 1:
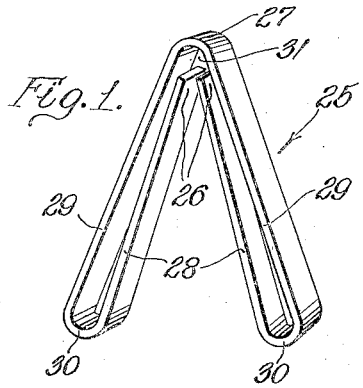
Figure 1 is a perspective view of a strap metal bus clamp embodying the principles of the present invention.
Figure 2:
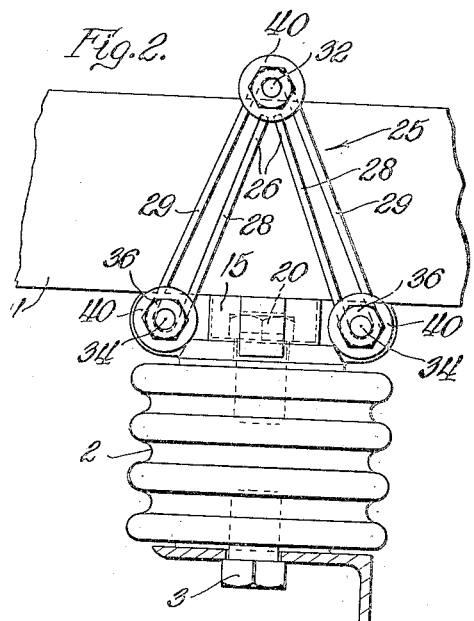
Figures 2 and 3 illustrate the application of a pair of bus clamps mounted on an insulator and supporting a flat bus bar.
Figure 3:
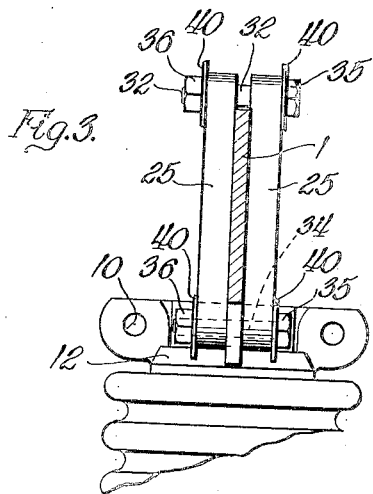
Figure 4:
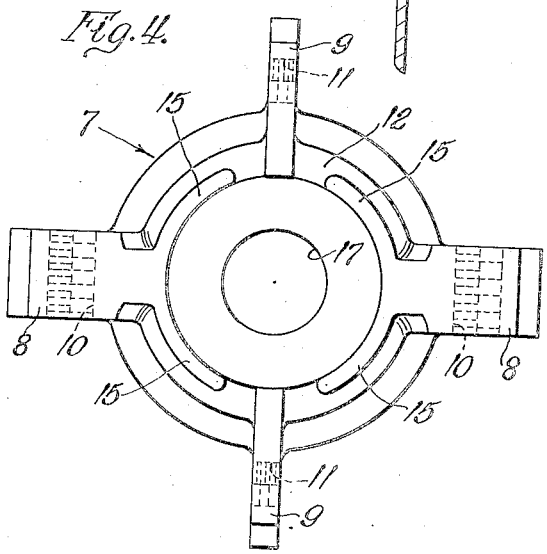
Figure 4 is a plan view of a clamp base with which the bus clamp of the type shown in Figure 1 is adapted to be used.

Referring now to the drawings, particularly Figures 1 to 4, I have illustrated a simple form of bus support employing bus clamps constructed according to the present invention. The bus 1 shown in Figures 2 and 3 is in the form of a flat bar of copper or other conducting material and is supported upon an insulator 2, the lower end of which receives a tap bolt 3 by which the insulator 2 is fastened to a frame angle 4, which may form a part of the bus structure. The upper end of the bus insulator 2 carries a clamp base 7, best shown in Figure 4, which is provided with two sets of wings or legs 8, 8 and 9, 9. The legs 8 are thicker than the legs 9, as will be referred to later, and the legs 8 have threaded openings 10 and the other set of legs 9 have threaded openings 11. The legs 8 and 9 project generally upwardly from the main body portion 12 of the base 7, and the inner portion of the thicker legs 8 have arcuate circumferential extensions 15. The main body portion 12 of the base 7 is provided with a central bolt hole 17 that receives a suitable tap bolt 20 (Figure 2) by which the base 7 may be connected to the upper end of the insulator 2.

The base 7 is particularly designed to receive flat bus bars when arranged in one or more vertical planes, and if a single bus bar is used, it is placed over the narrow legs 9, the latter being particularly designed so as to be of a width substantially equal to the width of a conventional copper bus bar, this being the arrangement illustrated in Figures 2 and 3.

In order to secure the bus bar 1 firmly to the insulator 2, suitable bus clamps are employed, and according to the principles of the present invention the clamps are preferably of the form indicated in Figure 1. This figure shows a bus clamp member two of which are adapted to be disposed on opposite sides of an associated bus bar, the bus clamp member being indicated in its entirety by the reference numeral 25. As best shown in Figure 1, each bus bar clamp member 25 comprises a relatively narrow metal strap oblong in cross section having its ends 26 bent backwardly so as to lie adjacent to the central portion 27 of the strap, thereby forming two pairs of spaced apart relatively narrow strap sections 28 and 29, the sections of each pair being connected together at the outer or lower portion of the clamp member by a bolt receiving loop 30. The strap sections 28 and 29 are generally parallel with respect to each other and are disposed edgewise, and the ends 26 are spaced, as indicated at 31, from the central portion 27 of the strap, the space 31 serving to receive a clamping bolt, such as the one indicated in Figures 2 and 3 by the reference numeral 32. The looped portions or bights 30 of the clamp member are adapted to receive attaching bolts, such as the bolts 34 (Figures 2 and 3). Each of the bolts 32 and 34 has a head 35 and a nut 36.

In constructing the bus bars supports illustrated in Figures 2 and 3, the insulator 2 is first mounted on the frame bar 4 by the tap bolt 3 and then the base 7 is fastened to the opposite end of the insulator 2 by the tap bolt 20. Next the bus clamp members 25 are disposed on opposite sides of the bus bar 1 and the bolts 32 and 34 inserted through the loops 30 and 31 on one clamp and threaded into the attaching lugs 9. The other clamp member on the opposite side of the bus bar is then disposed over the threaded ends of the bolts 32 and 34 and the nuts 36 threaded onto the ends of the bolts. The nuts 36 are then firmly tightened to clamp the bus bar 1 to the insulator 2. It is desirable, although not necessary, to provide washers 40 at opposite ends of each bolt so as to afford secure clamping engagement with the bus clamp members. The washers 40 and the upper bolt 32 engage not only the central looped section 27 of the strap forming the bus clamp member, but, in addition, the ends 26.

As mentioned above, the strap forming the bus clamp member 25 is preferably of non-magnetic material, such as a stainless steel alloy, and by disposing the sections 28 and 29 edgewise the member is very strong, especially against lateral deflection, yet the total cross section of the bus clamp member is materially less than the usual form of bus clamp member and little opportunity is afforded for any current to be induced in the bus clamp members when they are disposed about a bus bar carrying alternating current, and the losses arising by virtue of the use of the clamp are, therefore, negligible. In a bus clamp constructed according to the principles of the present invention there is, however, more than ample strength for holding the bus bars in position under the most adverse circumstances.

The clamp member, such as shown at 25 in Figure 1 and elsewhere, is constructed of a continuous bar or strip of metal oblong in cross section and bent across the faces of greater length to form the bights, such as 30, 30, 27 extending far enough around and fitting closely enough around the cylindrical walls of the cooperating tension bolts, such as 32, 34, 34, that the pull of the bolts does not produce the effect of spreading these bights nor permitting the individual reaches of the metal bar, such as 28, 29, to overturn.

Likewise in the case of the separator 45 shown in Figure 6, the bars forming the sides or legs of this separator cannot overturn without twisting of the metal at the bend, and at this point the device because of the bent form is exceptionally strong against twisting.

The result is a peculiarly efficacious form of clamp and of separator. In the clamp the pressure is applied by the tension bolts to the edges of the bights or bends, and by them transmitted to the leg portions. In the separator, the pressure is applied to the edges of the leg portions directly, but in each case the bight or bend portion performs the unique function of bracing the leg portions against overturning. The cross section of the clamp member or of the separator need not be strictly rectangular any more than the bus bar needs to be strictly rectangular in cross section. That is merely a convenient and effective form which I prefer for that reason.

Figure 8:
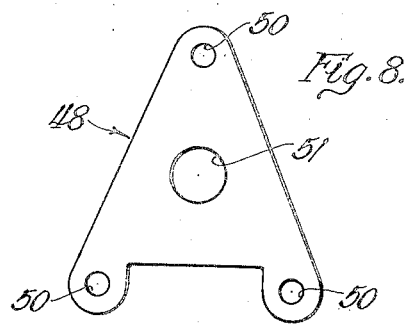
Figure 8 is a view of the clamp plate used in Figure 7.

Bus clamps constructed according to the principles of the present invention are capable of effective use in a variety of installations. For example, in Figure 5, I have shown a pair of clamp members 25, constructed as indicated in Figure 1, used to support a bus of the laminated type. Referring now to Figure 5, the insulator 2 carries the base, such as the base 7, shown in Figure 4, in such a position that a pair of bus bars 1 are supported edgewise on the thicker attaching legs 8. In the laminated bus, the bars are preferably held in spaced-apart relation, and according to the principles of the present invention, I provide a separator 45, best shown in Figure 6, which consists of a generally U- or V-shaped bar having ends 46 and a central section 47 through which the upper bolt 32a extends, the separator being bent or looped so as to be disposed edgewise between the bus bars 1, as shown in Figure 5, with the bus clamp members 25 on the outside of the bus bars. Somewhat longer bolts 32a and 34a are employed, and washers 40 are placed under the heads of the bolts and under the nuts 36. When arranged in this manner, the legs 9 of the base 7 are idle. More than two bus bars may be accommodated by resting the bars on the flanges 15 (Figure 4) and providing extra bus clamp members and separators and longer bolts.

Where flat bus bars are disposed horizontally, the installation may be made as indicated in Figures 7, 8, and 9. Figure 7 illustrates the support of a laminated bus consisting of two flat horizontally disposed bars 1 clamped by bolts 32a and 34a to a plate 48 that is, in turn, fastened to a spacer 49 and to the top of insulator 2 by the bolt 20. The plate 48 is best shown in Figure 8 and has bolt holes 50, registering with the bolt-receiving portions 30 and 31 (Figure 1) of the bus clamp member 25. The plate also has a hole 51 to receive an attaching tap bolt 3 (Figure 7). In this form, there is a bus bar spacer 55 which is constructed in the form illustrated in Figure 1, but preferably, though not necessarily, somewhat narrower. Since the spacer 55 is of exactly the same construction indicated in Figure 1, a further description of this part is not believed to be necessary.

Figures 9 and 10 illustrate the horizontal mounting of a single bus bar 1. In this installation the plate 48 is mounted on the spacer 49 in the same manner as described above in connection with the construction shown in Figure 7. On opposite sides of the horizontally disposed bus bar are two bus clamp members 25 constructed as shown in Figure 1 and clamped in place by bolts 60 and 61 to the plate 48.

Figures 11 and 12 illustrate the use of bus clamps, constructed according to the principles of the present invention, with, or as parts of, bus supports in which the bus bars are arranged vertically and are provided with cross braces. The supporting member for the bus bars is indicated at 70 and carries two or more vertically extending insulators 2 to which bases 7 are secured in any suitable manner, such as described above in connection with Figure 5. Where the bus bars 1 are arranged to form a laminated bus, spacers 45 are employed and the bus clamp members 25 are disposed on opposite sides of the two bus bars and the wider attaching legs 8 of the base 7. Bolts 72 in the lower loops 30 of the bus clamp members and an upper bolt 73 in the loop section 27 of each bus clamp member and the portion 47 of each separator 45 hold the bus bars 1 in position. Plates 48 are arranged on the outside of the two bus clamp members 25 for each bus, and the bolts 72 and 73 pass through registering openings formed in the plates 48. These plates are also provided with central openings to receive horizontally arranged tap bolts 80 which extend through one or more spacers 81 and into associated insulators 2 disposed horizontally. The outer horizontal insulators 2 may be fastened to any suitable fixed part 82 by a tap bolt 83. As will be clear from Figures 11 and 12, as many supporting units as are required may be installed in this manner, and it will be noted that the left hand bus has both lateral and vertical support through the bus clamps 25 and associated parts.

Figures 13 and 14 illustrate the application of bus clamp members constructed according to the principles of the present invention as a means for securing a cable terminal to a bus bar. In Figure 13 a cable adapted to be electrically connected with the bus bar 1 is indicated at 90 and includes a terminal 91 having a thimble section 92 and a flattened end 93 having an aperture 94.

If the bus to which the table 90 is to be connected is of the laminated type, the section 93 of the terminal is disposed between the bars 1, as indicated in Figure 14. Bus clamp members 25 are disposed on opposite sides of the bus bars 1 and clamping bolts 32a and 34a, together with their washers 40, are applied as indicated in Figure 5 and tightened, thereby effectively securing the terminal 91 to the bus. The upper bolt 32a preferably passes through the terminal opening 94, as best shown in Figure 14. If the terminal 91 is to be attached to a single bus bar, the bus clamp members are disposed so that one lies against the bus bar 1 and the other against the flattened section 93 of the terminal. Then when the associated bolts are inserted and tightened, the terminal is rigidly fixed to the bus bar.

Figure 15 illustrates the manner of connecting two flat bus bars 1 by the use of a pair of bus clamp members 25, constructed according to the principles of the present invention, and three bolts 32 and 34 and associated washers 40. The bus clamp members 25, constructed as indicated in Figure 1, are disposed on opposite sides of the overlapping portions of two bus bars 1 to be connected. Then the bolts 32 and 34 are inserted, with associated washers and nuts, and when the nuts 36 are tightened the two overlapping ends of the bus bars 1 are connected firmly and rigidly together. The clamping forces imposed on the bus clamp by the bolts 32 and 34 are applied edgewise to the clamp members 25, which is in the direction of their greatest strength.

Figure 16:
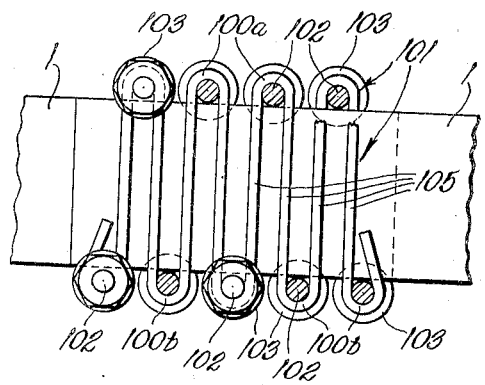
Figures 16 to 19, inclusive, show modified forms of bus clamps embodying the principles of the present invention.

Other forms of the present invention particularly adapted for connecting bus bars are indicated in Figures 16, 17, 18, and 19. In Figure 16, two bus bars 1 are shown as connected together by a pair of bus clamp members 100 each consisting of a continuous strap bent with a number of loops 100a and 100b, each loop being adapted to receive a clamping bolt 102 and associated washers 103. As in the previously described forms of bus clamps, in the form shown in Figure 16 tightening the bolts 102 forces the bus clamp members edgewise against the associated bus bars, and it will also be noted that the bolts 102 are disposed in the looped sections 100a and 100b so that the clamping pressure is applied to two edgewise disposed portions of the clamp members substantially midway between those portions so that the clamp member is not subjected to eccentrically applied forces. In Figure 16 the straight transverse sections 105 of the bus clamp members are disposed generally parallel with respect to each other.

Figure 17:
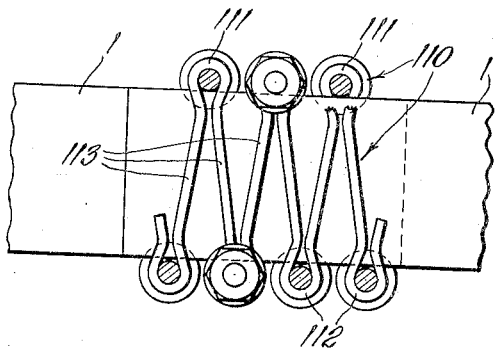

Figure 17 illustrates an arrangement similar to that shown in Figure 16, also embodying a continuous strap bent so as to form a number of generally transversely disposed sections arranged edgewise when in position against an associated bus bar. In Figure 17, the bus clamp member is indicated in its entirety by the reference numeral 110 and comprises looped bolt receiving sections 111 and 112, and intermediate portions 113, the latter being disposed in generally V-formation, instead of in parallelism as indicated at 105 in Figure 16.

Figure 18:
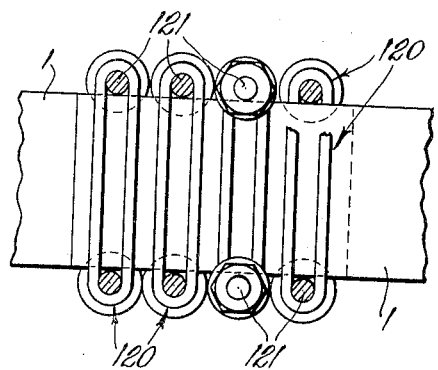
Figure 19:
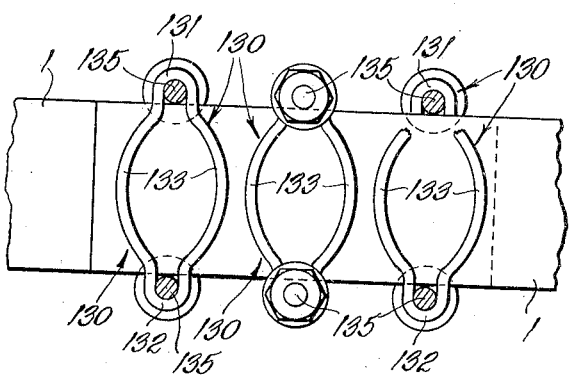

Figures 18 and 19 illustrate the formation of a bus clamp from a plurality of two or more endless flattened loops. In Figure 18 the flattened endless sections are each indicated by the reference numeral 120, and each section receives a clamping bolt 121 at each end. As in the previously described forms of bus clamps, the ring sections 120 are arranged edgewise against an associated bus bar 1. The endless sections 120 may be formed in any suitable manner as by welding the ends of a strap together to form an endless member, or the section 120 may be cut from flattened tube stock or the like.

Figure 19 illustrates a form of construction which is similar to that shown in Figure 18 and embodies a plurality of endless looped bus clamp sections 130, each having looped bolt receiving ends 131 and 132 and generally outwardly curved intermediate or transverse portions 133. Any suitable form of clamping bolts 135 may be used to secure the bus clamp sections 130 on opposite sides of the two bus bars to be connected. One advantage of the construction indicated in Figure 19 is that by varying the amount of curvature of the intermediate transverse sections 133, bus bars of different widths may be accommodated.

From the above description of the several types of installation, it will be apparent that strap metal bus clamp members embodying the principles of the above invention are adapted for a variety of uses in connection with the construction of bus supports.

In a similar manner, they are, of course, also adapted for use in connecting or joining flat bus bars, as described above in connection with Figures 15 to 19. Also, it will be observed from Figure 13 that cables can be connected by the use of the bus clamp members 25 without requiring that any holes be drilled in the bus bars. While in the several installations shown in the drawings and described above, the buses are illustrated as adapted for indoor use, it will be apparent that bus clamps constructed according to the principles of the present invention are equally effective with outdoor fixtures.

While I have shown and described above the preferred means in which the principles of the present invention have been embodied, it will be apparent to those skilled in the art that my invention is not to be limited to the particular details shown and described, but that, in fact, widely different means may be employed in the practice of the broader aspects of my invention.

What I claim, therefore, and desire to secure by Letters Patent is:

1. Means for clamping a bus conductor having side faces and edge faces, comprising tension bolts at opposite edge faces, said bolts having their axes parallel and being disposed transversely of the longitudinal axis of the bus conductor, means for anchoring the ends of the bolts at one side of the bus bar and a clamp member for the other side of the bus bar, said member comprising a bar of metal of oblong cross section and having a bight intermediate its ends extending about the cylindrical surface of one of the bolts with the longer dimension of the cross section of the clamp member extending in the same direction as the axes of the bolts, whereby a high degree of stiffness to bending is presented in the direction of the clamping pull of the bolts, the portions of the bar of metal adjoining the bight being spaced apart to resist overturning.

2. A member for applying pressure to a side face of a bus bar which bus bar is of oblong cross section and has edge faces and side faces, the member comprising a pair of legs joined by a bight portion the member being throughout its length of oblong cross section, and having side faces and edge faces, the bight being formed across the side faces so that the edge faces lie in substantially parallel planes, said edge faces being adapted to press against a side face of the bus bar, the member being adapted to reach substantially across the side face which it is to engage, said legs being spread apart to resist overturning.

3. The combination of the member of claim 2 with means for pressing said edge faces of the member against the side face of the bus bar.

4. The member defined in claim 2 further characterized by having a plurality of bight portions which extend beyond the edges of the side faces of the bus bar, and tension bolts extending through said extending portions for forcing the member toward the bus bar.

5. Separator means for spacing a bus bar away from a cooperating surface toward which the bar is pressed comprising a member of stiff metal of oblong cross section throughout whereby it has substantially parallel edge faces, said member having a bight portion and a plurality of leg portions diverging from the bight portion, the leg portions being substantially long enough to reach across the side face of the bus bar with which they are to cooperate and being adapted to bear edgewise against the face of the bus bar with which they are to cooperate.

6. Means for clamping a flat side face of a bus bar of oblong cross section against a flat cooperating member comprising a member of stiff metal of substantially uniform oblong cross section throughout and having side faces and edge faces, said member being formed into a plurality of bight portions spaced from each other by intermediate portions of a length great enough to permit the bight portions to extend beyond the lateral limits of the flat side faces of the bus bar with which the member cooperates, the member having one of its edge faces lying substantially in a single plane, whereby it is adapted to engage the flat side face of the bus bar, the intermediate portions being spaced apart to resist overturning.

7. Means for clamping a flat side face of a bus bar of oblong cross section against a flat cooperating member comprising the combination of a member of stiff metal of substantially uniform oblong cross section throughout, and having side faces and edge faces, said member being formed into a plurality of bight portions spaced from each other by intermediate portions of a length great enough to permit the bight portions to extend beyond the lateral limits of the flat side faces of the bus bar with which the member cooperates, the member having one of its edge faces lying substantially in a single plane, whereby it is adapted to cooperate with the flat side face of the bus bar, and tension bolts extending through said bight portions to press the said one edge face of the member toward the flat side face of the bus bar, the intermediate portions being spaced apart to resist the tendency of the member to overturn.

8. Means for clamping a flat side face of a bus bar of oblong cross section against a flat cooperating member comprising the combination of a member of stiff metal of substantially uniform oblong cross section throughout, and having side faces and edge faces, said member being formed into a plurality of bight portions each pair of which are spaced from each other by an intermediate portion of a length great enough to permit the bight portions to extend beyond the lateral limits of the flat side faces of the bus bar with which the member cooperates, the member having one of its edge faces lying substantially in a single plane, whereby it is adapted to cooperate with the flat side face of the bus bar, and tension bolts extending through said bight portions to press the said one edge face of the member toward the flat side face of the bus bar, said member comprising a pair of leg portions extending between bolts at opposite edges of the bus bar and the leg portions being spaced apart so that in cooperation with the engagement of the bolts with the bight portions the tendency to overturn is resisted.

9. Means for clamping a bus bar which has flat parallel side faces against a cooperating flat surface, comprising a pair of bolts lying transversely of said side faces at opposite edges of the bus bar, and a clamp member comprising a thin strip of stiff metal oblong in cross section throughout so that it has flat side faces and edge faces said strip being bent around the cylindrical walls of said bolts, one of its edge faces being adapted to engage a flat side face of the bus bar and the bolts having heads bearing against the outer edge faces at the bent parts of the strip to force the member against the bus bar, the member comprising intermediate portions which are spaced apart whereby the tendency to overturn is resisted.

10. The combination of claim 9 wherein each end of the strip is brought under a bolt head.

FOREST J. ARNOLD.